(12) United States Patent
Kaneta

(10) Patent No.: US 10,302,054 B2
(45) Date of Patent: May 28, 2019

(54) FUEL INJECTION VALVE

(71) Applicant: DENSO CORPORATION, Kariya, Aichi-pref. (JP)

(72) Inventor: Hiroki Kaneta, Kariya (JP)

(73) Assignee: DENSO CORPORATION, Kariya (JP)

( * ) Notice: Subject to any disclaimer, the term of this patent is extended or adjusted under 35 U.S.C. 154(b) by 18 days.

(21) Appl. No.: 15/504,842

(22) PCT Filed: Oct. 13, 2015

(86) PCT No.: PCT/JP2015/005172
§ 371 (c)(1),
(2) Date: Feb. 17, 2017

(87) PCT Pub. No.: WO2016/063492
PCT Pub. Date: Apr. 28, 2016

(65) Prior Publication Data
US 2017/0276107 A1    Sep. 28, 2017

(30) Foreign Application Priority Data
Oct. 23, 2014    (JP) .................................. 2014-216147

(51) Int. Cl.
*F02M 51/06*    (2006.01)
*F16K 31/06*    (2006.01)
*F02M 61/18*    (2006.01)

(52) U.S. Cl.
CPC .... *F02M 51/0653* (2013.01); *F02M 51/0685* (2013.01); *F02M 61/1866* (2013.01);
(Continued)

(58) Field of Classification Search
CPC .. F02M 61/18; F02M 61/188; F02M 61/1873; F02M 51/0653; F16K 31/0675
(Continued)

(56) References Cited

U.S. PATENT DOCUMENTS 4,151,958 A * 5/1979 Hofmann ............... F02M 45/08
239/533.3
4,417,694 A * 11/1983 Claxton ................. F02M 61/06
239/533.12
(Continued)

FOREIGN PATENT DOCUMENTS

JP          59-70079     5/1984
JP          2003-3934    1/2003
(Continued)

*Primary Examiner* — Steven J Ganey
*Assistant Examiner* — Joseph A Greenlund
(74) *Attorney, Agent, or Firm* — Nixon & Vanderhye P.C.

(57) ABSTRACT

A needle includes a first seal portion, which is formed at an end portion of the needle located on a side where an injection hole is placed, and a second seal portion, which is formed on a side of the first seal portion where a stationary core is placed. When a boundary between a first outer wall of the first seal portion and a second outer wall of the second seal portion is lifted away from or is seated against an inner wall, the injection hole is opened or closed. Thereby, a seat diameter of the boundary and the inner wall is stabilized, and a change in a fuel injection quantity caused by aging can be reduced. Furthermore, the first outer wall of the first seal portion is shaped into a form of a spherical surface.

3 Claims, 7 Drawing Sheets

(52) U.S. Cl.
CPC ..... *F02M 61/1886* (2013.01); *F16K 31/0675* (2013.01); *F02M 61/1873* (2013.01); *F02M 61/1893* (2013.01); *F02M 2200/02* (2013.01)

(58) Field of Classification Search
USPC .................................. 239/585.5, 533.12, 584
See application file for complete search history.

(56) References Cited

U.S. PATENT DOCUMENTS

| | | | | |
|---|---|---|---|---|
| 4,653,455 A * | 3/1987 | Eblen | ................. | F02M 57/02 123/458 |
| 6,427,932 B1 * | 8/2002 | Danckert | ............... | F02M 61/18 123/467 |
| 6,892,965 B2 * | 5/2005 | Haeberer | ............... | F02M 61/047 239/533.12 |
| 7,017,840 B2 * | 3/2006 | Kruger | ................. | F02M 61/1873 239/533.12 |
| 7,077,340 B2 * | 7/2006 | Boecking | ........... | F02M 61/1806 239/533.12 |
| 7,331,537 B2 * | 2/2008 | Kuegler | ............... | F02M 45/086 239/533.11 |
| 7,404,526 B2 * | 7/2008 | Cooke | ................. | F02M 45/086 239/102.2 |
| 8,002,205 B2 * | 8/2011 | Lambert | ............ | F02M 61/1873 123/446 |
| 8,083,160 B2 * | 12/2011 | Kato | ................. | F02M 51/0671 239/533.12 |
| 8,672,239 B2 * | 3/2014 | Ogura | ................. | F02M 61/1846 239/533.12 |
| 8,720,802 B2 * | 5/2014 | Kerst | ..................... | F02M 61/18 239/533.12 |
| 8,919,677 B2 * | 12/2014 | Soteriou | ................ | F02M 61/06 239/533.3 |
| 9,297,344 B2 * | 3/2016 | Gerber | ............... | F02M 61/1866 |
| 9,657,701 B2 * | 5/2017 | Kato | ................. | F02M 61/1893 |
| 9,903,329 B2 * | 2/2018 | Peters | ................... | F02M 61/10 |
| 2001/0054656 A1 * | 12/2001 | Ricco | ................. | F02M 61/04 239/533.9 |
| 2003/0057299 A1 * | 3/2003 | Itoh | ......................... | F02M 61/18 239/533.3 |
| 2003/0094517 A1 * | 5/2003 | Kato | ..................... | F02M 45/08 239/585.1 |
| 2005/0178860 A1 * | 8/2005 | Christ | ................. | F02M 61/042 239/533.12 |
| 2006/0249600 A1 * | 11/2006 | Sako | ..................... | F02M 61/06 239/533.12 |
| 2007/0051828 A1 * | 3/2007 | Cooke | ................. | F02M 51/0603 239/102.2 |
| 2015/0233334 A1 * | 8/2015 | Miyamoto | ........ | F02M 61/1886 239/584 |
| 2016/0025057 A1 * | 1/2016 | Kato | ................. | F02M 61/1893 239/584 |

FOREIGN PATENT DOCUMENTS

| | | | | |
|---|---|---|---|---|
| JP | 2003-106244 | | 4/2003 | |
| JP | 2003-120474 | | 4/2003 | |
| JP | 2003-314412 | | 11/2003 | |
| JP | 2004-197627 | | 7/2004 | |
| JP | 2010-38126 | | 2/2010 | |
| JP | 2010038126 A | * | 2/2010 | ............ F02M 61/18 |
| JP | 2010-180763 | | 8/2010 | |

\* cited by examiner

VALVE OPENING DIRECTION

VALVE CLOSING DIRECTION

FUEL INJECTION VALVE

This application is the U.S. national phase of International Application No. PCT/JP2015/005172 filed on Oct. 13, 2015 which designated the U.S. and claims priority to Japanese Patent Application No. 2014-216147 filed on Oct. 23, 2014, the entire contents of each of which are hereby incorporated by reference

CROSS REFERENCE TO RELATED APPLICATION

This application is based on and incorporates herein by reference Japanese Patent Application No, 2014-216147 filed on Oct. 23, 2014.

TECHNICAL FIELD

The present disclosure relates to a fuel injection valve that injects fuel in an internal combustion engine (hereinafter, referred to as an engine).

BACKGROUND ART

Previously, there is known a fuel injection valve that opens and closes an injection hole of a housing through reciprocation of a needle to inject fuel from an inside of the housing to an outside of the housing. For example, the patent literature 1 discloses a fuel injection valve that is configured such that an outer wall of a seal portion of a needle, which is contactable against a valve seat formed around an injection hole, is shaped into a form of a spherical surface that has a center in an inside of the needle.

When the seal portion is worn through repeated contact between the seal portion and the valve seat in the fuel injection valve, a fuel injection quantity of the fuel injection valve changes depending on a degree of wearing of the seal portion. In order to reduce the wearing of the seal portion, it is desirable to reduce a value known as a contact pressure that is obtained by dividing an application force, which is applied to the seal portion at the time of contacting the seal portion against the valve seat, by a cross sectional area of the seal portion, which is measured in a direction perpendicular to an application direction of the application force. Therefore, in general, the seal portion is formed to increase the above-described cross sectional area. In this way, even when the same application force is applied, the contact pressure is reduced. Thus, it is possible to reduce the wearing of the seal portion.

In the fuel injection valve of the patent literature 1, the outer wall of the seal portion is shaped into the form of the spherical surface, which has the center in the inside of the needle. Therefore, the cross sectional area, which is measured in the direction perpendicular to the application direction of the application force at the seal portion, is increased. However, due to resilient deformation of the seal portion, the location of the seal portion will deviate. Therefore, every time fuel is injected, the seat diameter may possibly change. Thus, the fuel injection quantity changes.

Furthermore, in the case where the outer wall of the seal portion is shaped into the form of the spherical surface, there may be a possibility of that a foreign object is continuously captured between the outer wall of the seal portion and the valve seat and thereby cannot be removed. Thus, it is difficult to ensure the fluid tightness in the valve closing time of the fuel injection valve.

In view of the above point, as a seal portion, which stabilizes a seat diameter to limit a change in the fuel injection quantity, there is proposed a seal portion that has tapered walls, which have different tapered angles. This seal portion is formed such that a boundary, which is formed between the tapered walls respectively having the different tapered angles, contacts the valve seat. Therefore, while the seat diameter is stabilized, a foreign object, which enters a gap between the outer wall of the seal portion and the valve seat, is crashed by the boundary to allow removal of the foreign object. However, in this seal portion, when an angle difference between the outer wall of the seal portion, which is located on the downstream side of the boundary, and the inner wall of the housing, which forms the valve seat, is increased in order to have a sufficient flow quantity of the fuel on the downstream side of the boundary, the contact pressure around the boundary of the seal portion is increased to possibly promote the wearing of the seal portion. In contrast, when the angle difference between the outer wall of the seal portion, which is located on the downstream side of the boundary, and the inner wall of the housing, which forms the valve seat, is decreased in order to reduce the contact pressure around the boundary of the seal portion, the sufficient flow quantity of the fuel, which is equal to or larger than a predetermined flow quantity, cannot be ensured on the downstream side of the boundary. Therefore, the required quantity of fuel, which is required for the injection, cannot be supplied to the injection hole.

CITATION LIST

Patent Literature

PATENT LITERATURE 1: JP2007-056876A (corresponding to US2007/0051828A1)

SUMMARY OF INVENTION

It is an objective of the present disclosure to provide a fuel injection valve that reduces a change in a fuel injection quantity caused by aging and reliably supplies a required quantity of fuel, which needs to be injected, to an injection hole.

According to the present disclosure, there is provided a fuel injection valve that includes a housing, a stationary core, a movable core, a coil, a needle, and an urging member.

The needle includes a first seal portion, which is formed at an end portion or the needle located on a side where the injection hole is placed, and a second seal portion, which is formed on a side of the first seal portion where the stationary core is placed.

In the fuel injection valve of the present disclosure, when a boundary between the first seal portion and the second seal portion is lifted away from or is seated against the valve seat, the injection hole is opened or closed, respectively. Furthermore, in the fuel injection valve of the present disclosure, at least one of a first outer wall of the first seal portion and a second outer wall of the second seal portion has a cross section, which includes the central axis and forms a curved line. Furthermore, in the fuel injection valve of the present disclosure, in the cross section, which includes the central axis, an angle defined between a tangent line, which is tangent to the first outer wall at the boundary, and the central axis is larger than an angle defined between a tangent line, which is tangent to the second outer wall at the boundary, and the central axis.

In the fuel injection valve of the present disclosure, when the boundary between the first seal portion and the second seal portion is lifted away from or is seated against the valve seat, the injection hole is opened or closed, respectively. In this way, even when the first seal portion and the second seal portion are resiliently deformed through the contact with the valve seat, the contact location between the boundary and the valve seat is unchanged. Therefore, it is possible to stabilize the seat diameter. Thus, the fuel injection quantity can be stabilized.

Furthermore, in the fuel injection valve of the present disclosure, at least one of the first outer wall and the second outer wall has the cross section, which includes the central axis and forms the curved line. At least one of a gap, which is formed between the first outer wall and an inner wall of the housing, and a gap, which is formed between the second outer wall and the inner wall of the housing, is increased in comparison to a case where both of the first outer wall and the second outer wall are tapered. Therefore, when the boundary is lifted away from the valve seat, a required quantity of fuel, which needs to be injected, can be reliably supplied to the injection hole.

Furthermore, in the fuel injection valve of the present disclosure, the first outer wall is formed such that in the cross section, which includes the central axis, the angle defined between the tangent line, which is tangent to the first outer wall at the boundary, and the central axis is larger than the angle defined between the tangent line, which is tangent to the second outer wall at the boundary, and the central axis. In this way, in comparison to a case where the outer wall of the seal portion, which is contactable against the valve seat, is shaped into a form of a spherical surface, a foreign object, which enters a gap between the boundary and the valve seat, can be removed by crashing the foreign object.

As discussed above, the fuel injection valve of the present disclosure stabilizes the seat diameter, so that the change in the fuel injection quantity caused by the aging can be reduced, and the foreign object, which enters the gap between the boundary and the valve seat, can be removed. Also, the fuel injection valve of the present disclosure increases the gap between the second outer wall, which is located on the upstream side of the boundary, and the inner wall of the housing, or the gap between the first outer wall, which is located on the downstream side of the boundary, and the inner wall of the housing, so that the required quantity of fuel, which needs to be injected, can be reliably supplied to the injection hole.

DESCRIPTION OF EMBODIMENTS

Various embodiments of the present disclosure will be described with reference to the drawings.

(First Embodiment)

Figure 1:
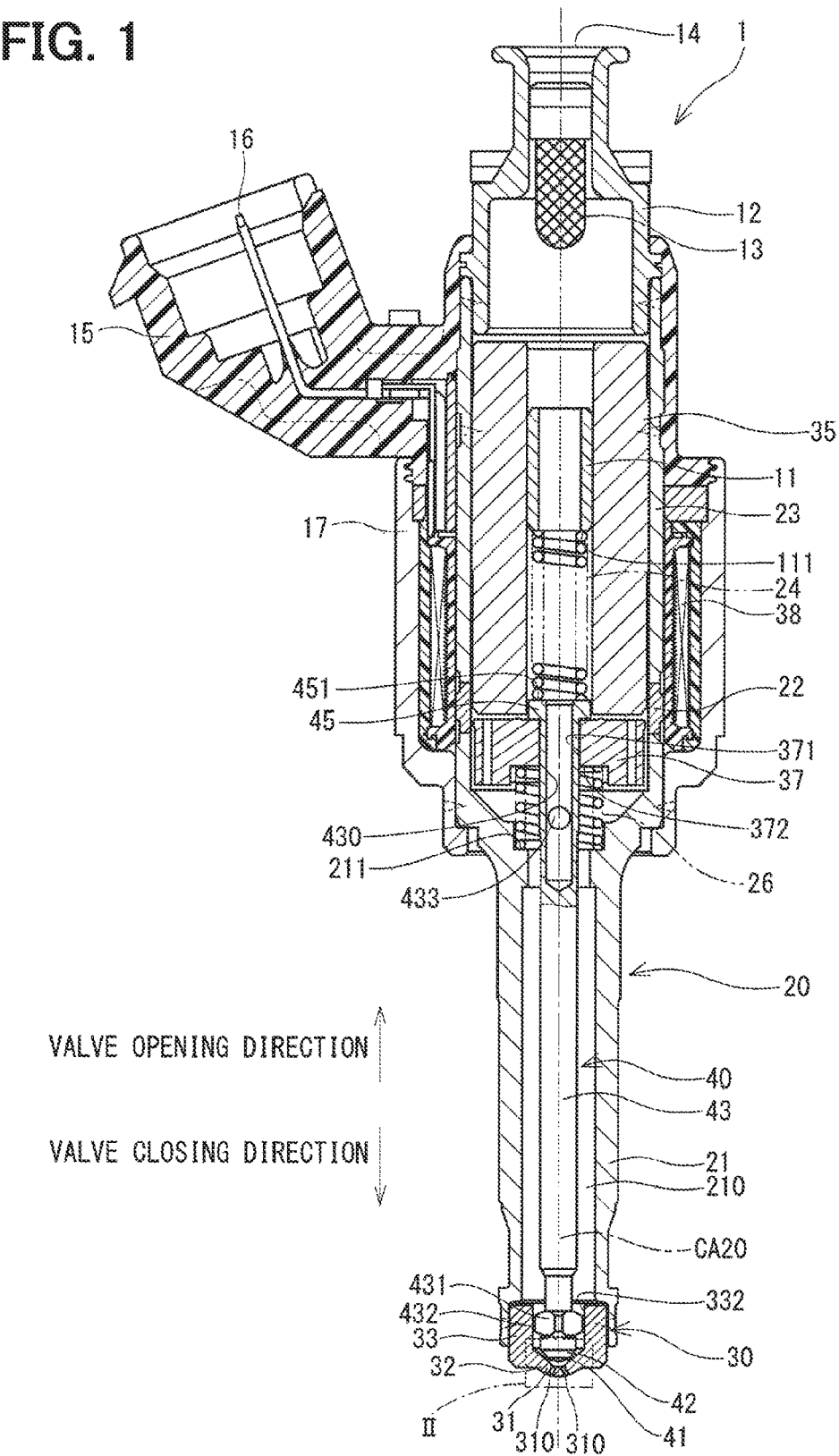
FIG. 1 is a cross sectional view of a fuel injection valve according to a first embodiment of the present disclosure.
Figure 2:
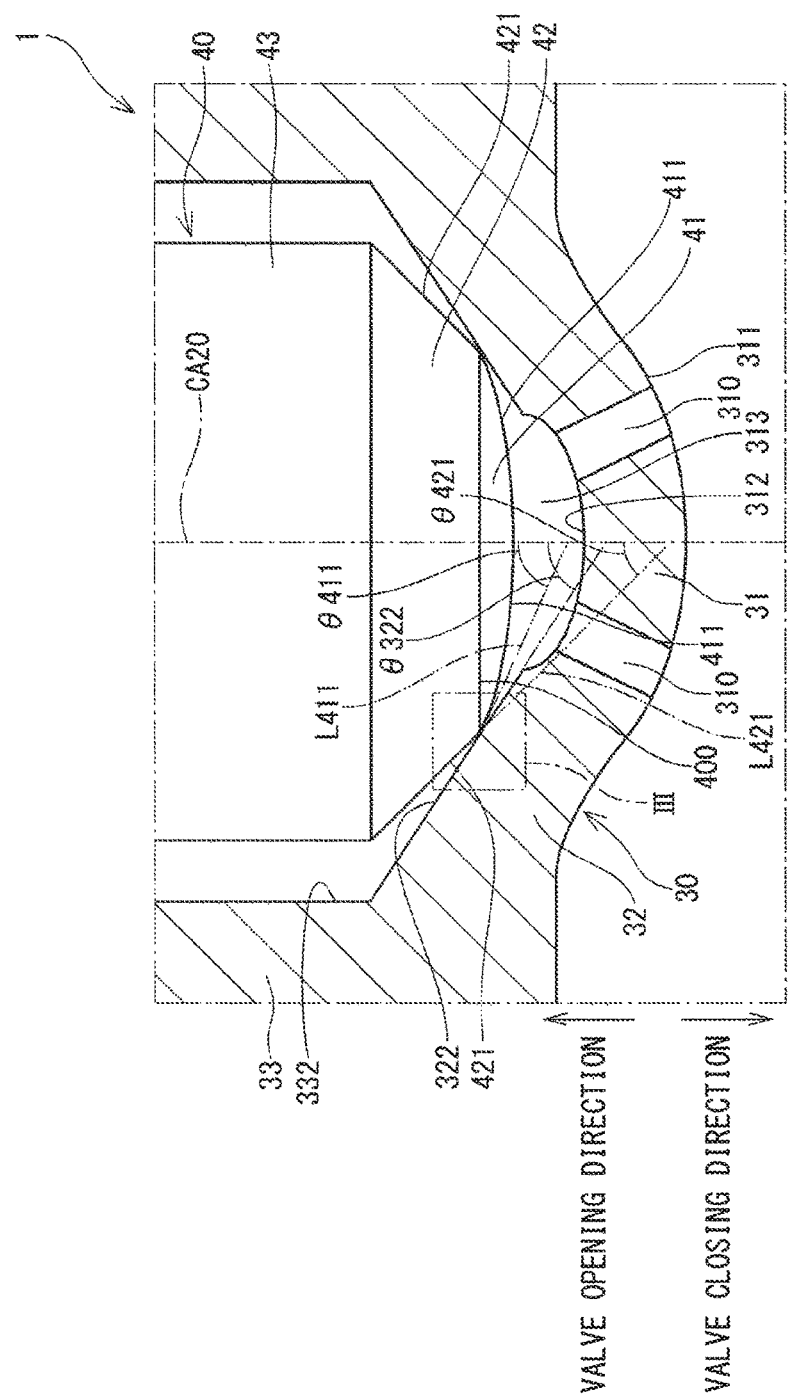
FIG. 2 is an enlarged cross sectional view of an area II in FIG. 1.
Figure 3:
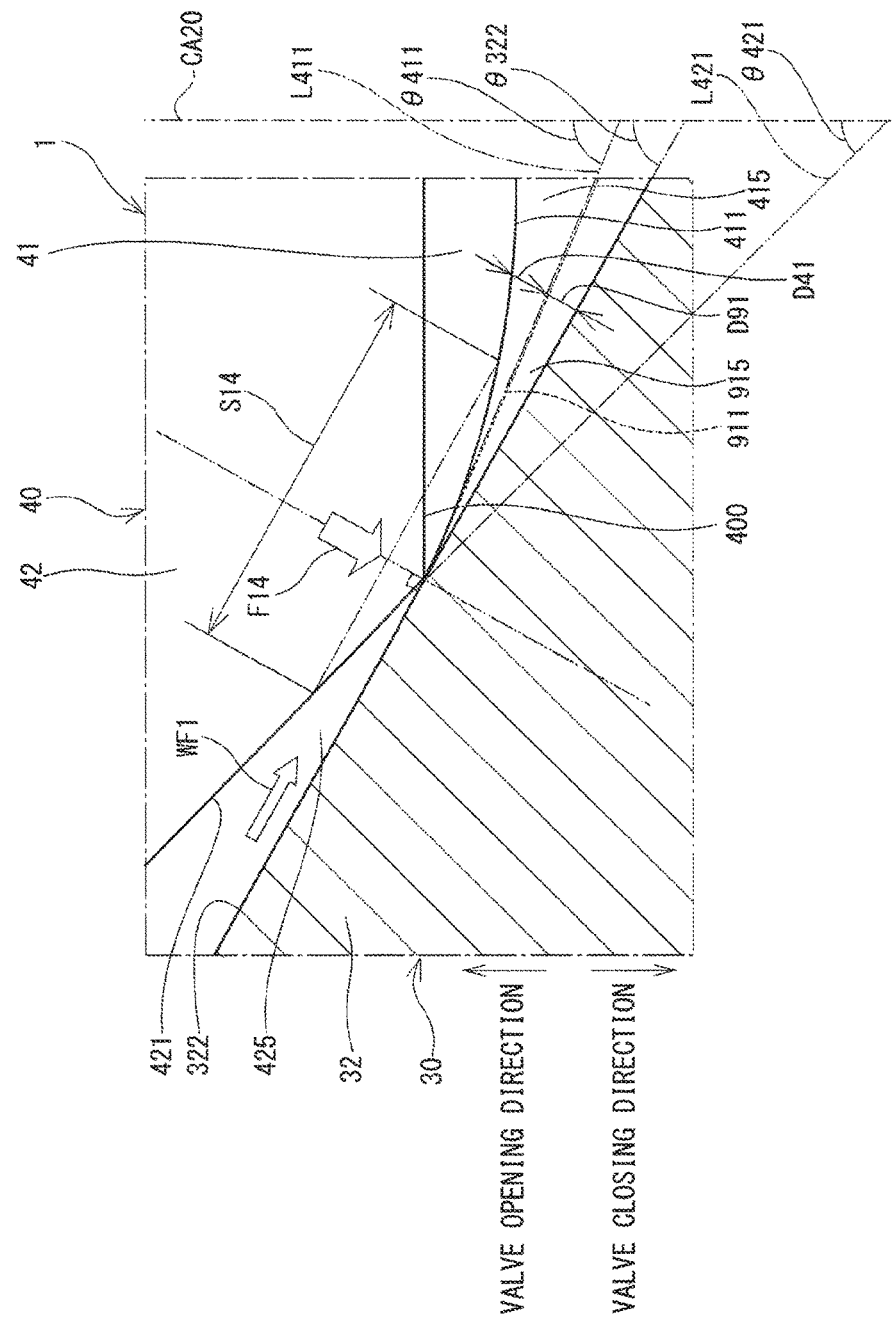
FIG. 3 is an enlarged cross sectional view of an area III in FIG. 2.

A fuel injection valve 1 according to a first embodiment of the present disclosure will be described with reference to FIGS. 1 to 3. FIGS. 1 to 3 indicate a valve opening direction, which is a direction of lifting a needle 40 away from an inner wall (serving as a valve seat) 322, and a valve closing direction, which is a direction of seating the needle 40 against the inner wall 322.

The fuel injection valve 1 is used in a fuel injection apparatus of, for example, a direct injection gasoline engine (not shown) and injects gasoline (serving as fuel) under a high pressure. The fuel injection valve 1 includes a housing 20, the needle 40, a movable core 37, a stationary core 35, a coil 38, a first spring (serving as an urging member) 24 and a second spring 26.

As shown in FIG. 1, the housing 20 includes a first tubular member 21, a second tubular member 22, a third tubular member 23 and an injection nozzle 30. The first tubular member 21, the second tubular member 22 and the third tubular member 23 are respectively configured into a generally cylindrical tubular form. Furthermore, the first tubular member 21, the second tubular member 22 and the third tubular member 23 are coaxially arranged in this order and are joined together.

The first tubular member 21 and the third tubular member 23 are made of a magnetic material, such as ferritic stainless steel, and are magnetically stabilized through a magnetic stabilization process. The first tubular member 21 and the third tubular member 23 have a relatively low degree of hardness. In contrast, the second tubular member 22 is made of a non-magnetic material, such as austenitic stainless steel.

The injection nozzle 30 is installed to an end part of the first tubular member 21, which is opposite from the second tubular member 22. The injection nozzle 30 is made of metal, such as martensitic stainless steel, and is shaped into a tubular form having a bottom. The injection nozzle 30 is welded to the first tubular member 21. The injection nozzle 30 is hardened through a quenching process to have a predetermined degree of hardness. The injection nozzle 30 includes an injection hole forming portion 31, a valve seat forming portion 32 and a tubular portion 33.

The injection hole forming portion 31 is symmetrically formed about a central axis CA20 of the housing 20, which is coaxial with a central axis of the fuel injection valve 1. A plurality of injection holes 310 is formed in the injection hole forming portion 31 and communicates between an inside and an outside of the housing 20. In a view taken from the inside of the housing 20, an outer wall 311 of the injection hole forming portion 31 projects in an axial direction of the central axis CA20. An inner wall 312 of the injection hole forming portion 31 is recessed in the projecting direction of the outer wall 311. The inner wall 312 forms a sac 313, which is communicated with the injection holes 310.

The valve seat forming portion 32 is an annular portion that is placed on a radially outer side of the injection hole forming portion 31. An inner wall 322 of the valve seat forming portion 32 is tapered such that an inner diameter of the inner wall 322 is progressively decreased toward the injection holes 310 in the axial direction of the central axis CA20. As shown in FIG. 2, an angle of the inner wall 322, which is defined relative to the central axis CA20, is an angle θ322. The needle 40, which will be described later, is contactable against the inner wall 322. When the needle 40 is lifted away from or is seated against the inner wall 322, the injection holes 310 are opened or closed, respectively.

Specifically, the inner wall 322 serves as a valve sat formed around the injection holes 310.

The tubular portion 33 is a tubular portion that is placed on a radially outer side of the valve seat forming portion 32. The tubular portion 33 projects from a radially outer side part of the valve seat forming portion 32 toward an opposite side, which is opposite from the projecting direction of the outer wall 311 of the injection hole forming portion 31. The tubular portion 33 is fixed to the end part of the first tubular member 21, which is opposite from an end part of the first tubular member 21 that is joined to the second tubular member 22.

The needle 40 is made of metal, such as martensitic stainless steel. The needle 40 is hardened through a quenching process to have a predetermined degree of hardness. The degree of hardness of the needle 40 is set to be substantially the same as the degree of hardness of the injection nozzle 30. The needle 40 is received in the inside of the housing 20 in such a manner that the needle 40 is reciprocatable integrally with the movable core 37 described later. The needle 40 includes a first seal portion 41, a second seal portion 42, a shaft portion 43 and a flange portion 45. The first seal portion 41, the second seal portion 42, the shaft portion 43 and the flange portion 45 are formed integrally as a one-piece body.

The first seal portion 41 is formed at an end part of the needle 40 located on the injection hole 310 side. A first outer wall 411, which is an outer wall of the first seal portion 41, is shaped into a form of a spherical surface of an imaginary sphere, a center of which is located along the central axis CA20 in an inside of the needle 40.

The second seal portion 42 is located on the stationary core 35 side of the first seal portion 41. A second outer wall 421, which is an outer wall of the second seal portion 42, is shaped into a tapered form, such that an inner diameter of the second outer wall 421 is progressively reduced toward the injection holes 310 in the axial direction of the central axis CA20. Specifically, the outer surface of the second outer wall 421 is in a form of a conical surface that has a diameter, which is progressively reduced toward the injection holes 310. Therefore, a shape of a cross section of the second outer wall 421, which includes the central axis CA20 and is shown in FIGS. 2 and 3, is straight.

A side of the second seal portion 42, which is located on the first seal portion 41 side, is formed to have the same size as that of a side of the first seal portion 41, which is located on the second seal portion 42 side. When the fuel injection valve 1 is placed into a valve closing state, a boundary 400 between the first outer wall 411 and the second outer wall 421 contacts the inner wall 322, as shown in FIG. 3. When the fuel injection valve 1 is placed into a valve opening state, the boundary 400 is spaced away from the inner wall 322.

As shown in FIGS. 2 and 3, in the cross section, which includes the central axis CA20, an angle θ411 is defined between a tangent line L411, which is tangent to the first outer wall 411 at the boundary 400, and the central axis CA20. This angle θ411 is larger than the angle θ322. Furthermore, an angle θ421 is defined between a tangent line L421, which is tangent to the second outer wall 421 at the boundary 400, and the central axis CA20. This angle θ421 is smaller than the angle θ322. That is, the angle θ411 is larger than the angle θ421.

The shaft portion 43 is located on the stationary core 35 side of the second seal portion 42. The shaft portion 43 is shaped into a cylindrical rod form.

A slidable part 431 is formed in an end part of the shaft portion 43, which is located on the second seal portion 42 side. The slidable part 431 is formed into a generally cylindrical tubular form. Parts of an outer wall 432 of the slidable part 431 are chambered. Remaining parts of the outer wall 432 of the slidable part 431, which are not chamfered, are slidable along an inner wall 332 of the tubular portion 33.

An end part of the shaft portion 43, which is located on the stationary core 35 side, is shaped into a tubular form. Furthermore, a flow passage 430, through which the fuel can flow, is formed in the inside of the end part of the shaft portion 43, which is located on the stationary core 35 side. A hole 433, which communicates between the flow passage 430 and the outside of the shaft portion 43, is formed in a part of the flow passage 430, which is located on the first seal portion 41 side.

The flange portion 45 is formed at the end part of the shaft portion 43, which is located on the stationary core 35 side. An outer diameter of the flange portion 45 is larger than an outer diameter of the shaft portion 43. An end surface of the flange portion 45, which is located on the first seal portion 41 side, contacts the movable core 37.

The needle 40 is reciprocated in the inside of the housing 20 while the slidable part 431 of the needle 40 is supported by the inner wall 332, and the shaft portion 43 of the needle 40 is supported by the inner wall of the second tubular member 22 through the movable core 37.

The movable core 37 is made of a magnetic material, such as ferritic stainless steel, and is shaped into a generally cylindrical tubular form. The movable core 37 is magnetically stabilized through a magnetic stabilization process. A degree of hardness of the movable core 37 is relatively low and is generally equal to the degree of hardness of the first tubular member 21 and the third tubular member 23 of the housing 20. However, a surface of the movable core 37 is, for example, chrome-plated to have a degree of hardness that can withstand a shock, which is applied to the movable core 37 through contact of the movable core 37 against the stationary core 35.

A through-hole 371 is formed in a generally center of the movable core 37. The shaft portion 43 of the needle 40 is inserted through the through-hole 371.

The stationary core 35 is made of a magnetic material, such as ferritic stainless steel, and is shaped into a generally cylindrical tubular form. The stationary core 35 is magnetically stabilized through a magnetic stabilization process. A degree of hardness of the stationary core 35 is generally same as the degree of hardness of the movable core 37. However, a surface of the stationary core 35 is, for example, chrome-plated to have a degree of hardness that is required to ensure a function of the stationary core 35 as a stopper for stopping the movable core 37. The stationary core 35 is welded to the third tubular member 23 of the housing 20 and is thereby fixed in the inside of the housing 20.

The coil 38 is shaped into a generally cylindrical tubular form and mainly surrounds a radially outer side of the second tubular member 22 and the third tubular member 23. When an electric power is supplied to the coil 38, the coil 38 generates a magnetic field. When the magnetic field is generated around the coil 38, a magnetic circuit is formed through the stationary core 35, the movable core 37, the first tubular member 21, the third tubular member 23 and a holder 17 described later. Thereby, a magnetic attractive force is generated between the stationary core 35 and the movable core 37, and thereby the movable core 37 is attracted to the stationary core 35. At this time, the needle 40, which contacts the end surface of the movable core 37 located on the stationary core 35 side, is moved together with the movable core 37 toward the stationary core 35, i.e., in the valve opening direction.

One end of the first spring 24 contacts an end surface 451 of the flange portion 45, which is located on the side that is opposite from the first seal portion 41. An adjusting pipe 11 is securely press fitted into an inside of the stationary core 35, and the other end of the first spring 24 contacts an end surface 111 of the adjusting pipe 11, which is located on the first seal portion 41 side. The first spring 24 has an expansion force in the axial direction of the central axis CA20. Thereby, the first spring 24 urges the needle 40 together with the movable core 37 toward the injection nozzle 30, i.e., in the valve closing direction.

One end of the second spring 26 contacts a step surface 372 of the movable core 37, which is located on the first seal portion 41 side. The other end of the second spring 26 contacts a step surface 211 that is shaped into a ring form and is formed in an inner wall of the first tubular member 21 of the housing 20. The second spring 26 has an expansion force in the axial direction of the central axis CA20. Thereby, the second spring 26 urges the movable core 37 together with the needle 40 in the valve opening direction.

In the present embodiment, the urging force of the first spring 24 is larger than the urging force of the second spring 26. Thereby, in a state where the electric power is not supplied to the coil 38, the needle 40 is placed into a state where the needle 40 contacts the inner wall 322, i.e., is placed into the valve closing state.

A fuel inlet pipe 12, which is shaped into a generally cylindrical tubular form, is press fitted into and is welded to an end part of the third tubular member 23, which is located on the side that is opposite from the second tubular member 22. A filter 13 is placed in an inside of the fuel inlet pipe 12. The filter 13 captures foreign objects, which are contained in the fuel supplied from an inlet opening 14 of the fuel inlet pipe 12.

A radially outer side of the fuel inlet pipe 12 and the third tubular member 23 are molded with resin. A connector 15 is formed in the molded portion. Terminals 16, through which the electric power is supplied to the coil 38, are insert molded in the connector 15. The holder 17, which is shaped into a tubular form to cover the coil 38, is placed on a radially outer side of the coil 38.

The fuel, which enters from the inlet opening 14 of the fuel inlet pipe 12, flows through the inside of the stationary core 35, the inside of the adjusting pipe 11, the flow passage 430, the hole 433 and the gap 210 between the first tubular member 21 and the shaft portion 43 and is guided into the inside of the injection nozzle 30. That is, a passage, which is from the inlet opening 14 to the gap 210, serves as a fuel passage that guides the fuel into the inside of the injection nozzle 30.

Next, the operation of the fuel injection valve 1 will be described.

When the electric power is not supplied to the coil 38, the coil 38 does not generate the magnetic field. Therefore, the magnetic attractive force is not generated between the stationary core 35 and the movable core 37. Thus, the needle 40 contacts the inner wall 322, and thereby the communication between the gap 210 and the sac 313 is blocked.

When the electric power is supplied to the coil 38, the magnetic field, which passes through the stationary core 35 and the movable core 37, is generated. The magnetic attractive force is generated between the stationary core 35 and the movable core 37 by the magnetic field, and thereby the movable core 37 is attracted to the stationary core 35. When the movable core 37 is moved in the valve opening direction, the needle 40, which is formed integrally with the movable core 37, is moved in the valve opening direction and is thereby lifted away from the inner wall 322. Thus, the gap 210 is communicated with the sac 313, so that the fuel in the gap 210 is injected from the injection holes 310.

When the supply of the electric power to the coil 38 is stopped, the magnetic attractive force between the stationary core 35 and the movable core 37 is lost. Thus, the needle 40 and the movable core 37 are moved in the valve closing direction due to a difference between the urging force of the first spring 24 and the urging force of the second spring 26. When the needle 40, which is moved into the valve closing direction, contacts the inner wall 322, the communication between the gap 210 and the sac 313 is blocked. Thereby, the injection of fuel from the injection holes 310 is stopped.

(a) In the fuel injection valve 1 of the first embodiment, in the valve closing state, as shown in FIG. 3, the boundary 400 contacts the inner wall 322. Here, characteristics and advantages of the fuel injection valve 1 will be described with reference to FIG. 3 in comparison with a fuel injection valve (hereinafter referred to as a fuel injection valve of a comparative example), in which the first outer wall and the second outer wall are tapered. In FIG. 3, the shape of the cross section of the first outer wall in the fuel injection valve of the comparative example is indicated by a dotted line 911.

In the fuel injection valve 1, in the state where the boundary 400 contacts the inner wall 322, an application force F14, which is applied to the first seal portion 41 and the second seal portion 42 at the time of contacting the boundary 400 to the inner wall (serving as the valve seat) 322, is applied between the needle 40 and the injection nozzle 30 in a direction perpendicular to an imaginary plane that includes the inner wall 322, as shown in FIG. 3. A cross sectional area of the first seal portion 41 and the second seal portion 42, which is measured in a direction perpendicular to the application direction of the application force F14, is defined as a cross sectional area S14, as shown in FIG. 3. In such a case, F14/S14, which is a value obtained by dividing the application force F14 by the cross sectional area S14 of the first seal portion 41 and the second seal portion 42 measured in the direction perpendicular to the application direction of the application force F14, serves as a contact pressure in the fuel injection valve 1.

The fuel injection valve 1 and the fuel injection valve of the comparative example will be compared with respect to this contact pressure. Around the area, at which the boundary contacts the inner wall (serving as the valve seat), as shown in FIG. 3, the cross sectional are, which is perpendicular to the application direction of the application force in the fuel injection valve of the comparative example, is generally the same as the cross sectional are, which is perpendicular to the application direction of the application force F14 in the fuel injection valve 1. Therefore, when the application force, which is applied to the needle in the fuel injection valve of the comparative example, is the same as the application force F14 in the fuel injection valve 1, the contact pressure is also the same in both of the fuel injection valve of the comparative example and the fuel injection valve 1. Therefore, like in the case of the fuel injection valve of the comparative example, in the fuel injection valve 1, wearing of the first seal portion 41 and the second seal portion 42 is reduced. Furthermore, in the fuel injection valve 1, the seat diameter can be further stabilized in comparison to the case where the outer wall, which is shaped into the form of the spherical surface, contacts the valve seat. Thus, in the fuel injection valve 1, the change in the fuel injection quantity caused by aging can be reduced.

(b) Furthermore, in a range that is relatively further from the range, in which the boundary 400 contacts the inner wall 322, the first outer wall 411, which is shaped into the form of the spherical surface, is formed at a location that is further away from the inner wall 322 in comparison to that of the fuel injection valve of the comparative example. Specifically, as shown in FIG. 3, in the fuel injection valve of the comparative example, a distance between the first outer wall and the inner wall of the housing is a distance D91. In contrast, in the fuel injection valve 1, a distance between the first outer wall 411 and the inner wall 322 is a distance D41 that is larger than the distance D91. Thereby, in the fuel injection valve 1, when the boundary 400 is lifted away from the inner wall 322, the fuel, which flows in a direction of a blank arrow WF1 through a gap 425 between the second outer wall 421 and the inner wall 322, flows into the sac 313 through a gap 415 of a relatively large width defined between the first outer wall 411 and the inner wall 322. In contrast, in the fuel injection valve of the comparative example, a width of a gap 915 between the first outer wall and the inner wall is smaller than that of the fuel injection valve 1. Therefore, in the fuel injection valve of the comparative example, there is a possibility of that the required quantity of fuel, which is required for the injection through the injection holes, cannot be conducted to the sac 313. Thus, in the fuel injection valve 1, the required quantity of fuel, which is required for the injection through the injection holes 310, can be reliably supplied to the sac 313.

(c) Furthermore, since the angle θ411 is larger than the angle θ421, the first outer wall 411 and the second outer wall 421, between which the boundary 400 is placed, form a relatively pointy shape, as shown in FIGS. 2 and 3. Thereby, a foreign object will less likely enter the gap between the boundary 400 and the inner wall 322. Furthermore, even when the foreign object enters the gap between the boundary 400 and the inner wall 322, the foreign object can be removed by crashing the foreign object with the boundary 400, which has the relatively pointy shape. Thus, occurrence of a malfunction of the fuel injection valve, which would be caused by the capturing of the foreign object, can be reduced.

(d) In the fuel injection valve 1, the first outer wall 411 is shaped into the form of the spherical surface. Thereby, the first seal portion 41 can be easily formed. Thus, the manufacturing costs of the fuel injection valve 1 can be reduced.

(e) In the fuel injection valve 1, the second outer wall 421 is tapered such that the inner diameter of the second outer wall 421 is progressively reduced in the axial direction of the central axis CA20 toward the injection holes 310. Thereby, in comparison to a case where the second outer wall is shaped into a curved surface form, a foreign object, which is carried by the fuel, will less likely enter a space adjacent to the range, in which the boundary 400 contacts the inner wall 322. Thus, the occurrence of the malfunction of the fuel injection valve, which would be caused by the capturing of the foreign object, can be further reduced.

(Second Embodiment)

Figure 4:
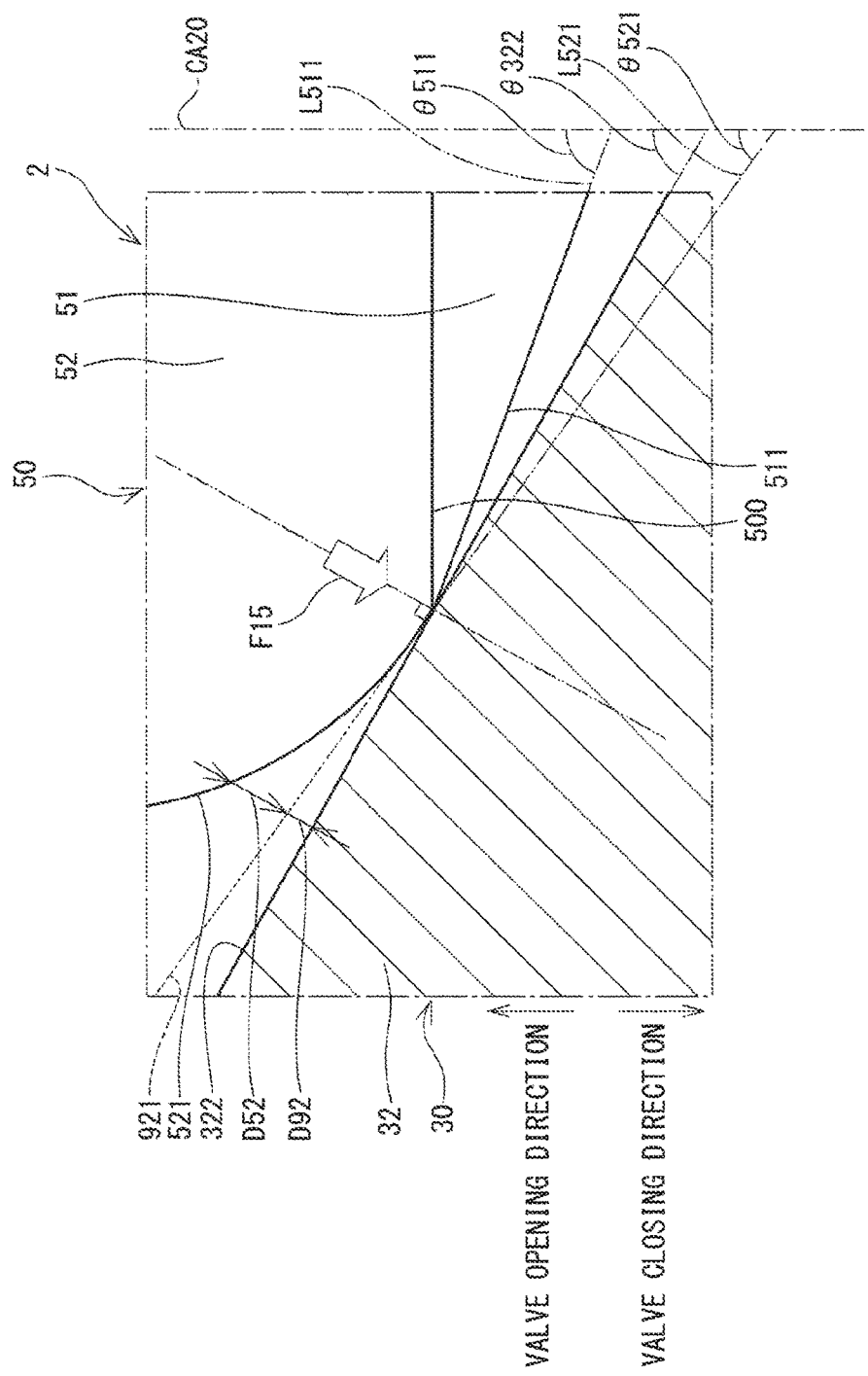
FIG. 4 is a cross sectional view of a fuel injection valve according to a second embodiment of the present disclosure.

Next, a fuel injection valve according to a second embodiment of the present disclosure will be described with reference to FIG. 4. The second embodiment differs from the first embodiment with respect to the shape of the outer wall of the first seal portion and the shape of the outer wall of the second seal portion. In the following discussion, the parts, which are substantially the same as those of the first embodiment, will be indicated by the same reference signs and will not be described for the sake of simplicity. FIG. 4, which corresponds to FIG. 2 of the first embodiment, indicates the valve opening direction, which is a direction of lifting a needle 50 away from the inner wall 322, and the valve closing direction, which is a direction of seating the needle 50 against the inner wall 322.

In the fuel injection valve 2 of the second embodiment, the needle 50 includes a first seal portion 51, a second seal portion 52, the shaft portion 43 and the flange portion 45. In the second embodiment, when the needle 50 is reciprocated, the needle 50 is lifted away from or is seated against the inner wall 322 to open or close the injection holes 310.

The first seal portion 51 is formed at an end part of the needle 50 located on the injection hole 310 side. As shown in FIG. 4, a first outer wall 511, which is an outer wall of the first seal portion 51, is shaped into a tapered form, such that an inner diameter of the first outer wall 511 is progressively reduced toward the injection holes 310 in the axial direction of the central axis CA20.

The second seal portion 52 is located on the stationary core 35 side of the first seal portion 51. A second outer wall 521, which is an outer wall of the second seal portion 52, is shaped into a form of a spherical surface of an imaginary sphere, a center of which is located along the central axis CA20 in an inside of the needle 50.

A side of the second seal portion 52, which is located on the first seal portion 51 side, is formed to have the same size as that of a side of the first seal portion 51, which is located on the second seal portion 42 side. When the fuel injection valve 2 is placed into the valve closing state, a boundary 500 between the first outer wall 511 and the second outer wall 521 contacts the inner wall 322, as shown in FIG. 4. When the fuel injection valve 2 is placed into the valve opening state, the boundary 500 is spaced away from the inner wall 322.

As shown in FIG. 4, in the cross section, which includes the central axis CA20, an angle θ511 is defined between a tangent line L511, which is tangent to the first outer wall 511 at the boundary 500, and the central axis CA20. This angle θ511 is larger than the angle θ322. Furthermore, an angle θ521 is defined between a tangent line L521, which is tangent to the second outer wall 521 at the boundary 500, and the central axis CA20. This angle θ521 is smaller than the angle θ322. That is, the angle θ511 is larger than the angle θ521.

As shown in FIG. 4, around the area, at which the boundary 500 contacts the inner wall 322, a cross sectional area of the first seal portion 51 and the second seal portion 52, which is measured in the direction perpendicular to the application direction of the application force F15, is the same as the cross sectional area of the first seal portion and the second seal portion, which is measured in the direction perpendicular to the application direction of the application force, in the fuel injection valve, in which the first outer wall and the second outer wall are tapered. Therefore, the contact pressure is also the same in both of the fuel injection valve 2 and the fuel injection valve, in which the first outer wall and the second outer wall are tapered. Furthermore, in a range that is relatively further from the range, in which the boundary 500 contacts the inner wall 322, a distance D52 between the second outer wall 521 and the inner wall 322 is larger than a distance D92 between the second outer wall (see the shape of the cross section indicated by a dotted line 921 in FIG. 4) and the inner wall in the fuel injection valve, in which the first outer wall and the second outer wall are tapered. Thereby, the second embodiment achieves the advantages (a) to (d) of the first embodiment.

(Third Embodiment)

Figure 5:
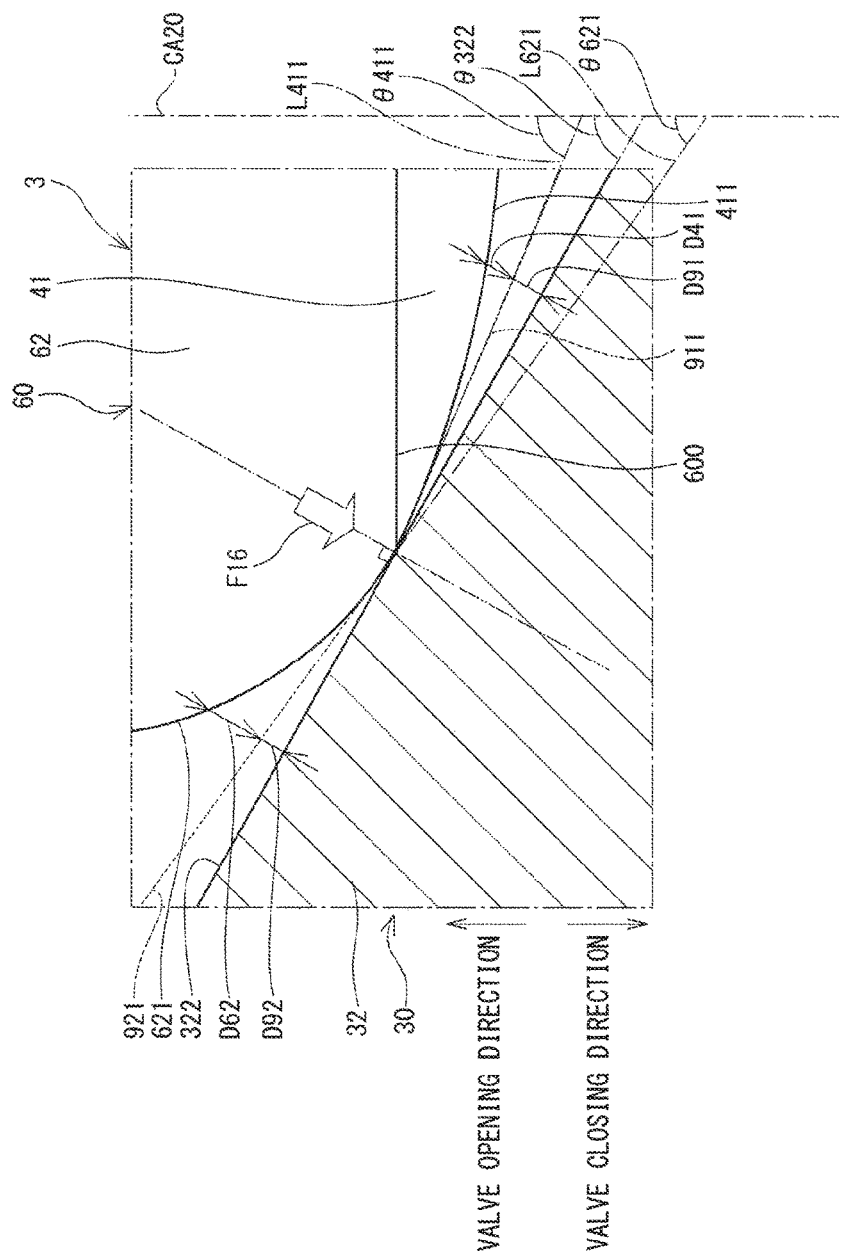
FIG. 5 is a cross sectional view of a fuel injection valve according to a third embodiment of the present disclosure.

Next, a fuel injection valve according to a third embodiment of the present disclosure will be described with reference to FIG. 5. The third embodiment differs from the first embodiment with respect to the shape of the outer wall of the second seal portion. In the following discussion, the parts, which are substantially the same as those of the first embodiment, will be indicated by the same reference signs and will not be described for the sake of simplicity. FIG. 5, which corresponds to FIG. 2 of the first embodiment, indicates the valve opening direction, which is a direction of lifting a needle 60 away from the inner wall 322, and the valve closing direction, which is a direction of seating the needle 60 against the inner wall 322.

In the fuel injection valve 3 of the third embodiment, the needle 60 includes the first seal portion 41, a second seal portion 62, the shaft portion 43 and the flange portion 45. In the third embodiment, when the needle 60 is reciprocated, the needle 60 is lifted away from or is seated against the inner wall 322 to open or close the injection holes 310.

The second seal portion 62 is located on the stationary core 35 side of the first seal portion 41. A second outer wall 621, which is an outer wall of the second seal portion 62, is shaped into a form of a spherical surface of an imaginary sphere, a center of which is located along the central axis CA20 in the inside of the needle 60.

In the third embodiment, the inner diameter of the imaginary sphere, which forms the second outer wall 621, is different from the inner diameter of the imaginary sphere, which forms the first outer wall 411. Specifically, the inner diameter of the imaginary sphere, which forms the second outer wall 621, is smaller than the inner diameter of the imaginary sphere, which forms the first outer wall 411.

A side of the second seal portion 62, which is located on the first seal portion 41 side, is formed to have the same size as that of a side of the first seal portion 41, which is located on the second seal portion 62 side. When the fuel injection valve 3 is placed into the valve closing state, a boundary 600 between the first outer wall 411 and the second outer wall 621 contacts the inner wall 322, as shown in FIG. 5. When the fuel injection valve 3 is placed into the valve opening state, the boundary 600 is spaced away from the inner wall 322.

As shown in FIG. 5, in the cross section, which includes the central axis CA20, an angle θ621 is defined between a tangent line L621, which is tangent to the second outer wall 621 at the boundary 600, and the central axis CA20. This angle θ621 is larger than the angle θ322. That is, the angle θ411 is larger than the angle θ621.

As shown in FIG. 5, around the area, at which the boundary 600 contacts the inner wall 322, a cross sectional area of the first seal portion 41 and the second seal portion 62, which is measured in the direction perpendicular to the application direction of the application force F16, is the same as the cross sectional area of the first seal portion and the second seal portion, which is measured in the direction perpendicular to the application direction of the application force, in the fuel injection valve, in which the first outer wall and the second outer wall are tapered. Therefore, the contact pressure is also the same in both of the fuel injection valve 3 and the fuel injection valve, in which the first outer wall and the second outer wall are tapered. Furthermore, in a range that is relatively further from the range, in which the boundary 600 contacts the inner wall 322, the distance D41 between the first outer wall 411 and the inner wall 322 is larger than a distance D91 between the second outer wall (see the shape of the cross section indicated by the dotted line 911 in FIG. 5) and the inner wall in the fuel injection valve, in which the first outer wall and the second outer wall are tapered. Furthermore, a distance D62 between the second outer wall 621 and the inner wall 322 is larger than the distance D92 between the second outer wall (see the shape of the cross section indicated by the dotted line 921 in FIG. 5) and the inner wall in the fuel injection valve, in which the first outer wall and the second outer wall are tapered. Thereby, the third embodiment achieves the advantages (a) to (d) of the first embodiment.

(Fourth Embodiment)

Figure 6:
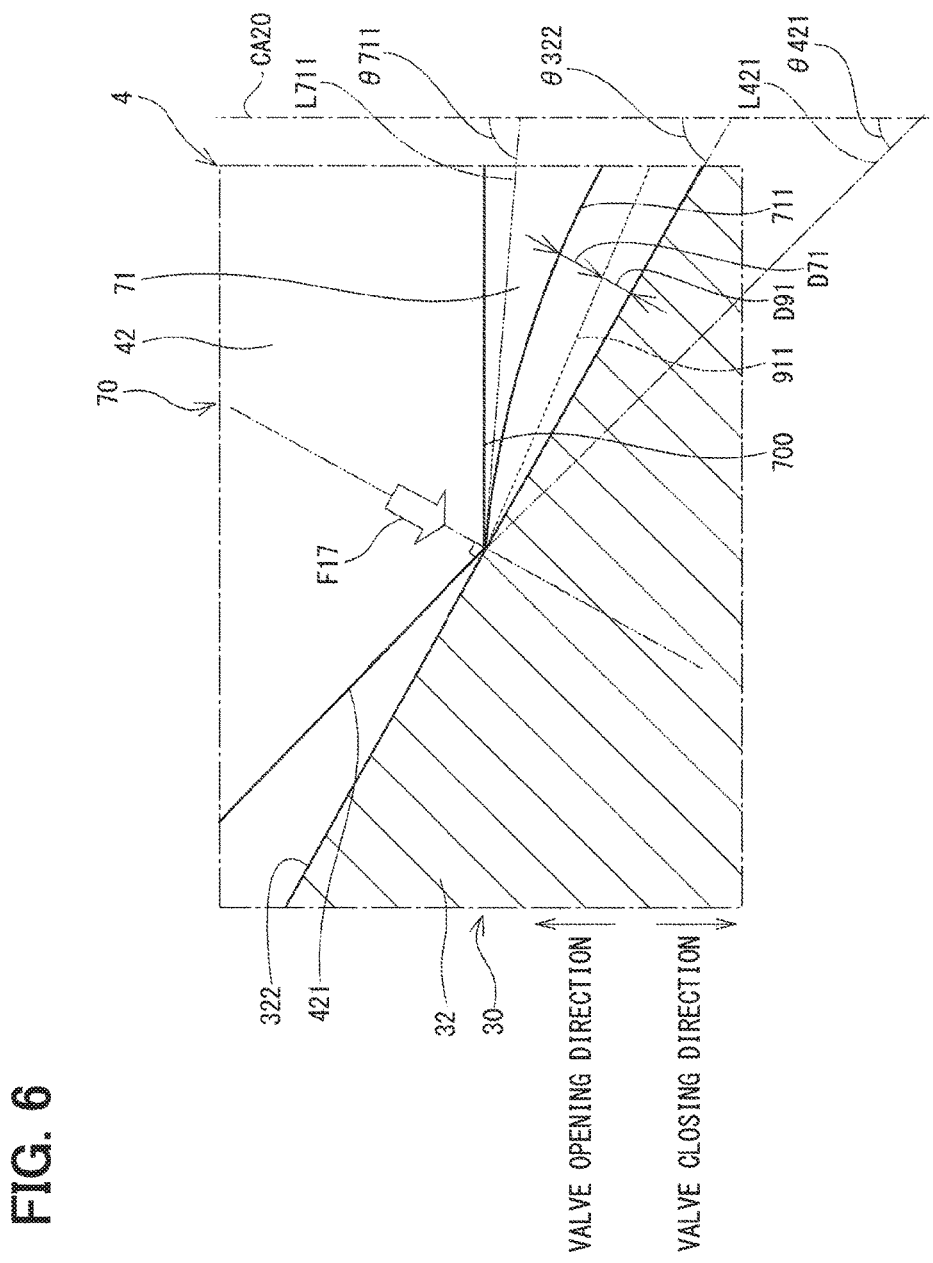
FIG. 6 is a cross sectional view of a fuel injection valve according to a fourth embodiment of the present disclosure.

Next, a fuel injection valve according to a fourth embodiment of the present disclosure will be described with reference to FIG. 6. The fourth embodiment differs from the first embodiment with respect to the shape of the outer wall of the first seal portion. In the following discussion, the parts, which are substantially the same as those of the first embodiment, will be indicated by the same reference signs and will not be described for the sake of simplicity. FIG. 6, which corresponds to FIG. 2 of the first embodiment, indicates the valve opening direction, which is a direction of lifting a needle 70 away from the inner wall 322, and the valve closing direction, which is a direction of seating the needle 70 against the inner wall 322.

In the fuel injection valve 4 of the fourth embodiment, the needle 70 includes the first seal portion 71, the second seal portion 42, the shaft portion 43 and the flange portion 45. In the fourth embodiment, when the needle 70 is reciprocated, the needle 70 is lifted away from or is seated against the inner wall 322 to open or close the injection holes 310.

The first seal portion 71 is formed at a distal end part of the needle 70 located on the injection hole 310 side. A first outer wall 711, which is an outer wall of the first seal portion 71, is shaped into a form of a spherical surface of an imaginary sphere, a center of which is located along the central axis CA20 at the outside of the needle 70.

A side of the first seal portion 71, which is located on the second seal portion 42 side, is formed to have the same size as that of a side of the second seal portion 42, which is located on the first seal portion 71 side. When the fuel injection valve 4 is placed into the valve closing state, a boundary 700 between the first outer wall 711 and the second outer wall 421 contacts the inner wall 322, as shown in FIG. 6. When the fuel injection valve 4 is placed into the valve opening state, the boundary 700 is spaced away from the inner wall 322.

As shown in FIG. 6, in the cross section, which includes the central axis CA20, an angle θ711 is defined between a tangent line L711, which is tangent to the first outer wall 711 at the boundary 700, and the central axis CA20. This angle θ711 is larger than the angle θ322. That is, the angle θ711 is larger than the angle θ421.

As shown in FIG. 6, around the area, at which the boundary 700 contacts the inner wall 322, a cross sectional area of the first seal portion 71 and the second seal portion 42, which is measured in the direction perpendicular to the application direction of the application force F17, is the same as the cross sectional area of the first seal portion and the second seal portion, which is measured in the direction perpendicular to the application direction of the application force, in the fuel injection valve, in which the first outer wall and the second outer wall are tapered. Therefore, the contact pressure is also the same in both of the fuel injection valve 4 and the fuel injection valve, in which the first outer wall and the second outer wall are tapered. Furthermore, in a range that is relatively further from the range, in which the boundary 700 contacts the inner wall 322, the distance D71 between the first outer wall 711 and the inner wall 322 is larger than the distance D91 between the second outer wall (see the shape of the cross section indicated by the dotted line 911 in FIG. 6) and the inner wall in the fuel injection valve, in which the first outer wall and the second outer wall are tapered. Thereby, the fourth embodiment achieves the advantages, which are the same as those of the first embodiment.

Furthermore, in the fourth embodiment, the boundary 700 is more pointed than the boundary 400 of the first embodiment. Thereby, even when the foreign object enters the gap between the boundary 700 and the inner wall 322, the foreign object can be more easily crashed with the boundary 700 in comparison to the first embodiment. Therefore, the tolerability against the foreign object can be improved, and the occurrence of the malfunction of the fuel injection valve, which would be caused by the capturing of the foreign object, can be further reduced.

(Fifth Embodiment)

Figure 7:
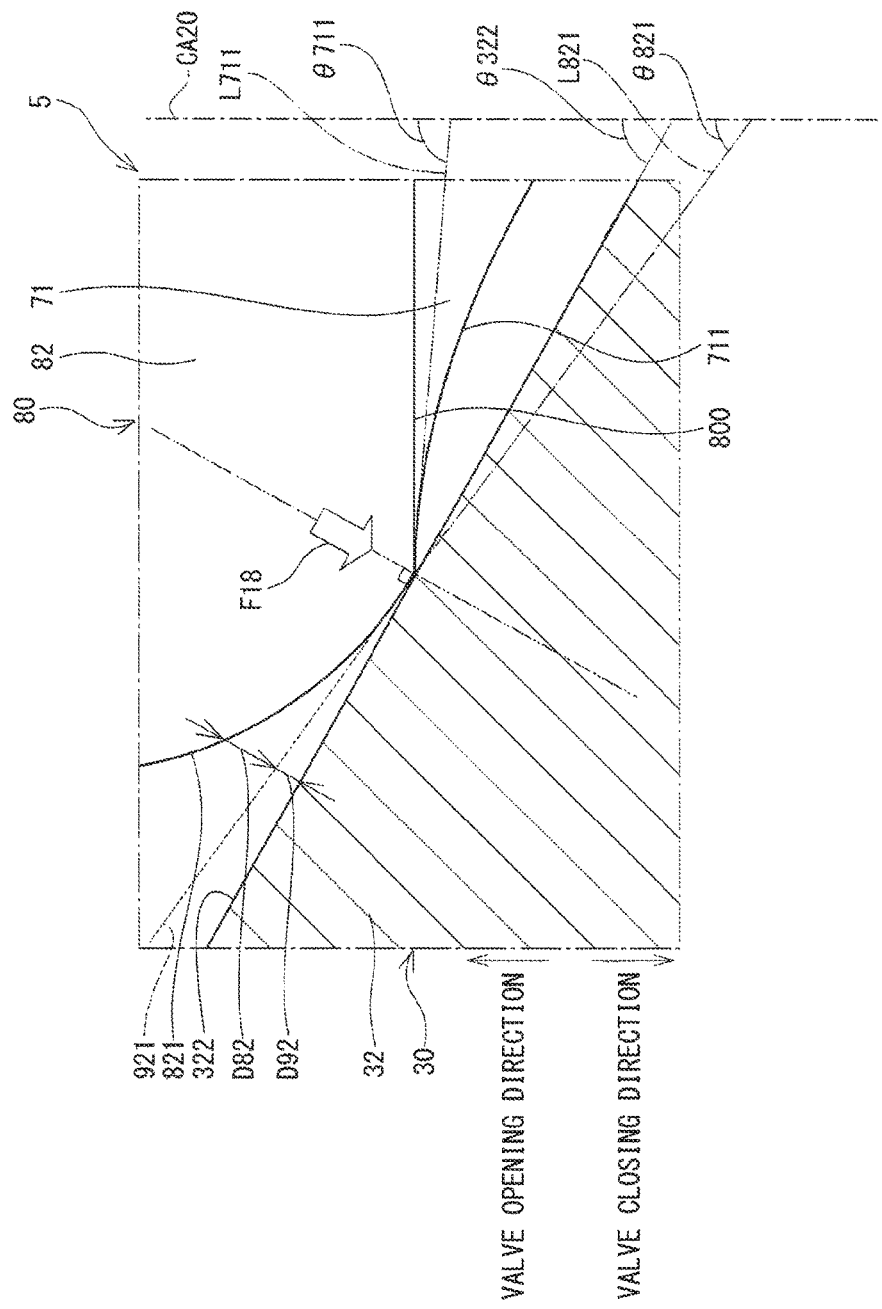
FIG. 7 is a cross sectional view of a fuel injection valve according to a fifth embodiment of the present disclosure.

Next, a fuel injection valve according to a fifth embodiment of the present disclosure will be described with reference to FIG. 7. The fifth embodiment differs from the fourth embodiment with respect to the shape of the outer wall of the second seal portion. In the following discussion, the parts, which are substantially the same as those of the fourth embodiment, will be indicated by the same reference signs and will not be described for the sake of simplicity. FIG. 7, which corresponds to FIG. 6 of the fourth embodiment, indicates the valve opening direction, which is a direction of lifting a needle 80 away from the inner wall 322, and the valve closing direction, which is a direction of seating the needle 80 against the inner wall 322.

In the fuel injection valve 5 of the fifth embodiment, the needle 80 includes the first seal portion 71, a second seal portion 82, the shaft portion 43 and the flange portion 45. In the fifth embodiment, when the needle 80 is reciprocated, the needle 80 is lifted away from or is seated against the inner wall 322 to open or close the injection holes 310.

The second seal portion 82 is located on the stationary core 35 side of the first seal portion 71. A second outer wall 821, which is an outer wall of the second seal portion 82, is shaped into a form of a spherical surface of an imaginary sphere, a center of which is located along the central axis CA20 at the outside of the needle 80.

A side of the second seal portion 82, which is located on the first seal portion 71 side, is formed to have the same size as that of a side of the first seal portion 71, which is located on the second seal portion 82 side. When the fuel injection valve 5 is placed into the valve closing state, a boundary 800 between the first outer wall 711 and the second outer wall 821 contacts the inner wall 322, as shown in FIG. 7. When the fuel injection valve 5 is placed into the valve opening state, the boundary 700 is spaced away from the inner wall 322.

As shown in FIG. 7, in the cross section, which includes the central axis CA20, an angle θ821 is defined between a tangent line L821, which is tangent to the second outer wall 821 at the boundary 800, and the central axis CA20. This angle θ821 is larger than the angle θ322. That is, the angle θ711 is larger than the angle θ821.

As shown in FIG. 7, around the area, at which the boundary 800 contacts the inner wall 322, a cross sectional area of the first seal portion 71 and the second seal portion 82, which is measured in the direction perpendicular to the application direction of the application force F18, is the same as the cross sectional area of the first seal portion and the second seal portion, which is measured in the direction perpendicular to the application direction of the application force, in the fuel injection valve, in which the first outer wall and the second outer wall are tapered. Therefore, the contact pressure is also the same in both of the fuel injection valve 5 and the fuel injection valve, in which the first outer wall and the second outer wall are tapered. Furthermore, in a range that is relatively further from the range, in which the boundary 800 contacts the inner wall 322, a distance D82 between the second outer wall 821 and the inner wall 322 is larger than the distance D92 between the second outer wall (see the shape of the cross section indicated by the dotted line 921 in FIG. 7) and the inner wall in the fuel injection valve, in which the first outer wall and the second outer wall are tapered. Thereby, the fifth embodiment achieves the advantages (a) to (d) of the first embodiment.

(Other Embodiments)

(1) In the first and fourth embodiments, the second outer wall is tapered. However, the second outer wall may not be tapered. The second outer wall may be parallel to the central axis. Here, the term "parallel" may be parallel in strict sense or may be parallel that can be visually recognizable as parallel. In such a case, in the cross section, which includes the central axis, an angle, which is defined between a tangent line being tangent to the second outer wall at the boundary and the central axis, is recognized as zero (0).

(2) In the first, third, fourth and fifth embodiments, the first outer wall is shaped into the form of the spherical surface. In the second, third and fifth embodiments, the second outer wall is shaped into the form of the spherical surface. However, these outer walls may not be shaped into the form of the sphere surface that has a constant curvature along the entire extent thereof. In each of these outer walls, the curvature may be changed along the outer wall.

(3) In the above embodiments, the first outer wall, the second outer wall, or both of the first outer wall and the second outer wall is(are) shaped into the form of the spherical surface, which has the center along the central axis. However, the center of the imaginary sphere, which includes the above-described outer wall(s), may be displaced from the central axis.

(4) In the above embodiments, the first seal portion is formed at the end part of the needle, which is located on the injection hole side. However, the location of the first seal portion should not be limited to this location. Another member may be placed on the injection hole side of the first seal portion. It is only required that the boundary between the first outer wall and the second outer wall is contactable to the inner wall, which serves as the valve seat.

The present disclosure should not be limited to the above embodiments and may be implemented in various other ways without departing from the scope of the present disclosure.

The invention claimed is:

1. A fuel injection valve comprising:
a housing that includes:
an injection hole that is formed at one end of the housing in an axial direction of a central axis of the housing and injects fuel; and
a valve seat that is formed around the injection hole;
a stationary core that is fixed in an inside of the housing;
a movable core that is reciprocatably placed on a side of the stationary core where the valve seat is placed;
a coil that is operable to attract the movable core toward the stationary core when an electric power is supplied to the coil;
a needle that is reciprocatable integrally with the movable core in the inside of the housing, wherein the needle includes a first seal portion, which is formed at an end portion of the needle located on a side where the injection hole is placed, and a second seal portion, which is formed on a side of the first seal portion where the stationary core is placed, and when a boundary between the first seal portion and the second seal portion is lifted away from or is seated against the valve seat, the injection hole is opened or closed, respectively; and a spring that urges the needle in a valve closing direction, wherein:

a second outer wall, which is an outer wall of the second seal portion, is in a form of a convex spherical surface that protrudes from an inside to an outside of the needle;

a first outer wall is an outer wall of the first seal portion, and in a cross section of the needle, which includes the central axis, an angle defined between a tangent line, which is tangent to the first outer wall at the boundary, and the central axis is larger than an angle defined between a tangent line, which is tangent to the second outer wall at the boundary, and the central axis;

the first outer wall is in a form of a convex spherical surface;

the valve seat is tapered such that an inner diameter of the valve seat is progressively decreased toward the injection hole in the axial direction of the central axis from an upstream side of a contact point of the valve seat, which is configured to contact the boundary between the first seal portion and the second seal portion at a time of seating the boundary against the valve seat, to a downstream side of the contact point of the valve seat; and the first outer wall has a cross section, which includes the central axis and forms a curved line shaped into a convex form that protrudes from the inside to the outside of the needle while the curved line is placed adjacent to the convex spherical surface of the second outer wall.

2. The fuel injection valve according to claim 1, wherein the convex spherical surface of the first outer wall and the convex spherical surface of the second outer wall are not concentric to each other.

3. The fuel injection valve according to claim 1, wherein a curvature of the convex spherical surface of the first outer wall is smaller than a curvature of the convex spherical surface of the second outer wall.

* * * * *